W. J. MORRISON.
PRESSURE RELIEF VALVE FOR PNEUMATIC TIRES.
APPLICATION FILED FEB. 15, 1913.
1,086,550. Patented Feb. 10, 1914.
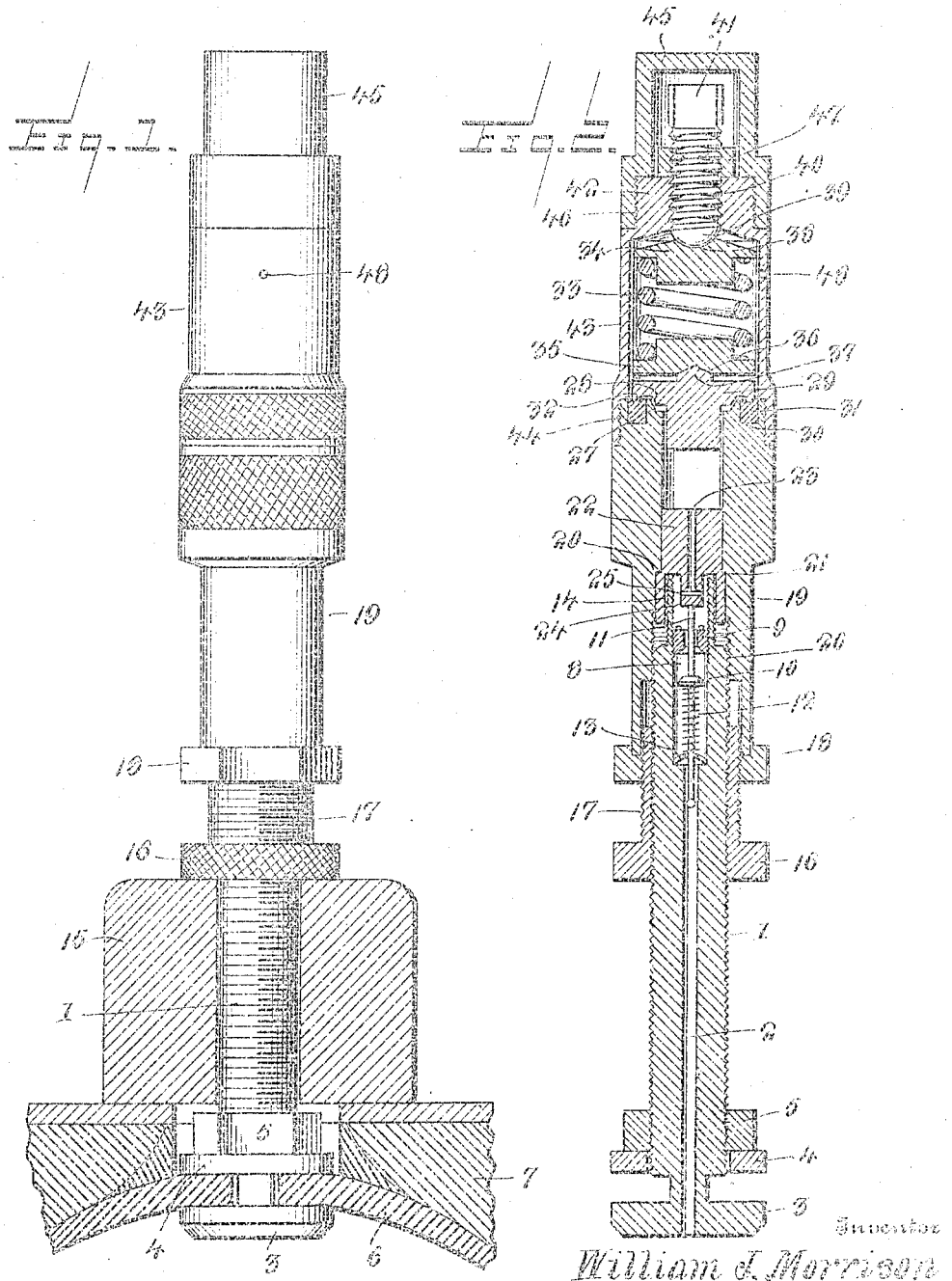
William J. Morrison
By Victor J. Evans
Attorney

UNITED STATES PATENT OFFICE.

WILLIAM J. MORRISON, OF SIOUX CITY, IOWA.

PRESSURE-RELIEF VALVE FOR PNEUMATIC TIRES.

1,086,550.   Specification of Letters Patent.   Patented Feb. 10, 1914.

Application filed February 15, 1913. Serial No. 748,652.

*To all whom it may concern:*

Be it known that I, WILLIAM J. MORRISON, a citizen of the United States, residing at Sioux City, in the county of Woodbury and State of Iowa, have invented new and useful Improvements in Pressure-Relief Valves for Pneumatic Tires, of which the following is a specification.

This invention relates to air relief valves for pneumatic tires and the like, the object in view being to provide a valve of the class referred to which will liberate air from a tire in case the internal expansion and pressure thereof becomes excessive, so as to prevent injury to the tire, such as unusual strains and the consequent giving away and blowing out of the same.

A further object of the invention is to provide a valve of the class referred to which is readily applicable to the tube of the ordinary valve now commonly used in connection with pneumatic tires.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of the relief valve of this invention shown applied to the ordinary valve tube of a pneumatic tire. Fig. 2 is a longitudinal section through the same.

In the drawings, I have shown the ordinary pneumatic tire valve, which, as is well understood, comprises the externally threaded valve tube 1 having the central bore or opening 2 extending entirely through the same, and provided at one end with a head 3, and adjacent thereto with a washer 4, and nut 5, by means of which the valve tube may be secured to the inner tube 6 of a pneumatic tire, the outer case or shoe of which is shown at 7.

The outer end of the bore 2 is, as usual, enlarged, as shown at 8, to receive the valve seat 9 and valve 10, the latter being mounted on the stem 11, and the valve being normally closed by means of an expansion spring 12 arranged behind the valve and bearing against a suitable rest or shoulder 13. As is well understood, the stem 11 of the valve 10 normally projects well toward, and in some cases beyond, the extremity of the valve tube 1, which is ordinarily reduced and externally threaded, as at 14. Ordinarily, in fastening the valve tube in place, with respect to the felly 15 of the wheel, a nut is threaded on the valve tube 1, said nut being shown at 16 as bearing against the inner face of the felly 15.

All of the parts hereinabove described are found in the ordinary valve with which pneumatic tires are supplied for inflation and deflation purposes.

In carrying out the present invention, I provide a special nut 16 having an extending sleeve portion 17 which is threaded both exteriorly and interiorly, as shown in Fig. 2, the interior threads being provided to adapt the nut 16 and sleeve 17 to be adjusted inwardly and outwardly on the valve tube 1, the external threads being provided for a lock nut 18, by means of which the relief valve tube, hereinafter described, is held locked on the sleeve 17. The sleeve 17, together with the nut 16, thus forms a union, by means of which the relief valve tube is connected to the ordinary valve tube.

The relief valve as a whole comprises a relief valve body 19 having a central longitudinal bore extending entirely through the same from end to end, said bore being reduced, at 20, to form a shoulder, against which is seated a corresponding shoulder 21 on a core 22 which occupies a position about centrally of the length of the relief valve tube 19, said core being provided with a central hole 23 extending longitudinally through the same, and the core being further provided with a reduced valve displacing extension or shoulder 24 transversely bored through, as shown at 25, so as to allow the air to pass from the ordinary valve tube 1 through the hole 23 into the outer end portion of the relief valve tube 19, where it is checked by the pressure relief valve, hereinafter particularly described.

The tube 19 is internally threaded, as shown at 26, to screw upon the valve tube 1, as shown in Fig. 2, the tube 19 being threaded along the tube 1 until the shoulder 24 displaces the valve 10, as clearly shown in Fig. 2. When the tubes 19 and 20 are in the desired relation to each other, so as to hold the valve 10 open, the adjustment is fixed by means of the lock nut 18, hereinabove referred to, which bears directly against the inner end of the tube 19. In this way, the relief valve as a whole is coupled to the ordinary valve tube and is capable of being adjusted relatively thereto, and locked in a fixed position.

The tube 19 is provided at its outer extremity with an internally beveled valve seat 27, with which coöperates the correspondingly beveled face 28 of a relief valve 29. In addition to the seat 27, the outer extremity of the tube 19 is provided with a groove 30, in which is placed a rubber gasket 31. The valve 29 is provided with an annular rib or projecting face 32 which bears directly against the rubber gasket or seat 31. The faces 28 and 32 of the valve 29 are concentric with each other, as are also the bearing faces 27 and the gasket 31 of the tube 19. In this way, a metal to metal contact is provided between the relief valve and its seat, and in addition thereto, a metal to rubber contact which positively excludes dust and prevents leakage of air, when the relief valve is held against its seat.

The relief valve 29 is ordinarily held to its seat by a pressure retaining spring 33, at the opposite ends of which are guides 34 and 35, the guide 35 being provided with a socket 36 which receives a stud or projection 37 on the outer end of the valve 29. The guide 34 is provided with a socket 38, in which fits the rounded inner extremity 39 of a tension screw 40 provided with a suitable head 41 adapting it to be turned in or out. The screw 40 is threaded into the solid outer end 42 of a spring casing 43 which incloses the spring 33, and its guides 34 and 35, and has a threaded connection, at 44, with the outer extremity of the valve tube 19. A cap 45 is threaded upon the outer end of the spring casing 43, as shown at 46, while a lock nut 47 is threaded on the tension screw 40 and bears against the adjacent extremity of the part 42. By turning the screw 41, more or less tension may be given to the spring 33 to correspondingly vary its pressure against the valve 29, so as to enable the latter to retain air in the tire at a predetermined pressure. 48 designates a vent in the spring casing 43, through which the air, brought about by excessive air pressure in the tire escapes to the atmosphere.

From the foregoing description, it will now be understood that the air relief valve as a whole is adapted to be coupled to the ordinary valve tube of a pneumatic tire by means of a threaded union, which also acts to hold the ordinary valve tube in clamped relation to the wheel felly. Furthermore, the relief valve as a whole may be adjusted longitudinally of the ordinary valve tube 1, so as to unseat the valve 10 and position the parts so as to allow the air from the tire to pass through and beyond the core 22, where it will act on and be held in check by the relief valve 29. In warm weather or in traveling over sandy roads, where the air in the tire becomes overheated, and therefore expands, in case the pressure exceeds a certain predetermined point of safety, such excessive pressure will displace the valve 29 and allow the air to pass through the vent 48. This obviates any possibility of the tire becoming expanded and strained to an excessive point, and, therefore, greatly increases the life and durability of the tire with which the relief valve of this invention is associated.

What is claimed is:

1. A pressure relief valve for pneumatic tires, comprising a pressure relief valve tube having an annular conical metal valve seat, an annular rubber valve seat concentric with the metal seat, a relief valve embodying a conical face and an annular projecting rib respectively bearing against the metal and rubber seats, a pressure retaining spring pressing said valve toward the seats, and a threaded union for mounting the pressure relief valve as a whole on the ordinary valve tube of a pneumatic tire.

2. A pressure relief valve for pneumatic tires, comprising a pressure relief valve tube having an annular metal valve seat, a rubber valve seat concentric with the metal seat, a relief valve embodying concentric faces bearing against the metal and rubber seats, a stud projecting outwardly from said valve a pressure retaining spring pressing said valve toward the seats, a tension screw for regulating the pressure of said spring against the relief valve, said screw having a hemispherical inner end, a movable guide for one end of said spring formed with a hemispherical socket for the inner end of said screw, a guide for the inner end of said spring formed with a socket for the valve stud, and a threaded union for mounting the pressure relief valve as a whole on the ordinary valve tube of a pneumatic tire.

In testimony whereof I affix my signature in presence of two witnesses.

WILLIAM J. MORRISON.

Witnesses:
  ELSIE V. BRETHERTON,
  R. A. OLIVER.